Nov. 8, 1966 A. J. VAN NOORD 3,283,607
REMOTE CONTROL MIRROR
Filed April 22, 1963 2 Sheets-Sheet 1

INVENTOR.
Andrew J. Van Noord
BY
Dale A. Winnie
ATTORNEY

Nov. 8, 1966 A. J. VAN NOORD 3,283,607
REMOTE CONTROL MIRROR
Filed April 22, 1963 2 Sheets-Sheet 2

INVENTOR.
Andrew J. Van Noord
BY
Dale A. Winnie
ATTORNEY

United States Patent Office 3,283,607
Patented Nov. 8, 1966

3,283,607
REMOTE CONTROL MIRROR
Andrew J. Van Noord, Grand Rapids, Mich., assignor to Kent Engineering Consultants, Grand Rapids, Mich., a partnership of Michigan
Filed Apr. 22, 1963, Ser. No. 275,192
9 Claims. (Cl. 74—501)

This invention relates to rear view mirrors in general and more particularly to remote control rear view mirrors for use on automotive vehicles and the like.

Numerous different types of remote control rear view mirrors have been proposed for use with automotive vehicles since the advent of the closed car. Many have used push-pull rods, rotatable shafts, gear means, etc., to accomplish the desired movement. However, the most popular form has been that which makes use of flexible cable controls to accomplish the required mirror head movement.

Cable controlled rear view mirrors have used the flexible cable control wires to either transmit torque to turn the mirror or to push and pull the mirror about a swivel joint connection.

The push-pull type control has proven most popular but the remote control mirror has not had the success expected because of the production, assembly and installation problems presented in mirrors of this type which have been offered and which keep the cost too high for the ordinary public.

Normally, a point contact type swivel joint has been used in place of the conventional ball and socket type swivel joint; presumably to avoid any tightness in the joint which might require undue cable tension and ultimate breakage. This, in turn, has required some means of holding the mirror on its support and avoiding any slack in the control cables. One method of accomplishing this has been to use the cables to hold the mirror on its support and to bias the mirror against the pull of the control cables to hold them tight. Herein has been the cause for a great many of the production and assembly problems.

To obtain mirror control, two or three flexible cables have been used. The three-cable control obtains mirror movement by the use of any two of the control wires in different combinations to push and pull the mirror about its swivel point joint. The two-cable control uses the control wires together on one side of the swivel point connection, and against spring action, to move the mirror in one direction and alternate use of the wires to obtain movement in a different direction, with a combination movement to accomplish the desired setting.

The preferred form of control has been one which rotates to wind or unwind the cables for one type action and pulls both together for the other type action.

It will be appreciated that these mirrors are expensive to manufacture, because of the assembly problems, and require adjustment upon installation which adds appreciably to the expense and makes them impractical for other than optional equipment use.

It is an object of this invention to provide an economical remote control rear view mirror for use as standard equipment on automotive and other vehicles and which may be preadjusted during assembly and have means disposed apart therefrom for operational control as desired.

It is an object of this invention to provide a remote control rear view mirror which requires only two flexible cable control connections to minimize costs and problems of manufacture, assembly and installation.

It is also an object of this invention to provide a remote control rear view mirror having a simple and relatively inexpensive form of universal joint connection affording fixed mounting of the mirror, stability against lateral rotation and adjustable movement of the mirror part as desired.

Another object of this invention is to make use of a universal joint connection for the adjustable mirror which enables any desired adjustment but includes cooperative fixed axes for the normal and most frequently required adjustments and rigidity against lateral rotation thereof.

In this regard, it is an object of this invention to make use of a crossed pivotal axes universal joint connection and to provide means for orienting the universal joint connection to obtain vertical and horizontal adjustment of the mirror; it being most common to adjust a mirror up or down for people having different heights of vision and in or out depending upon their viewing disposition relative to the mirror.

It is an object of this invention to provide a remote control rear view mirror wherein the control cable connections thereto are offset from different of the fixed axes so that each may obtain pivotal movement of the mirror about a different pivotal axes without interference therebetween but enabling cooperation as desired.

The cable connections are arranged for push-pull operation of the mirror to obtain the required pivotal movement.

It is an object of this invention to make use of a single counterbalanced cable tensioning means at the adjustable mirror to simplify manufacture, assembly and installation and to have such tensioning means serve both control cables in stabilizing the mirror setting obtained.

It is an object of this invention to make use of simple, inexpensive and commercially available tensioning means in the mirror head assembly and such as is adapted for use in a simple and expedient manner.

It is another object of this invention to provide a simple and compact control assembly for the adjustable mirror and one which may be pre-assembled, adjusted, and installed within a space and through an opening of relatively insignificant size.

It is an object of this invention to provide a control lever adjustment which is complementary to the mirror head adjustment for coordination of movement therebetween.

It is an object of this invention to provide means within the control assembly, despite its small size, for counterbalancing the cable tensioning means in the mirror head and enabling complete control by the cable means without the necessity of overcoming the tensioning force provided thereby.

It is also an object of this invention to provide means in the control assembly for obtaining stable settings of the control cables for greater stability in the mirror settings obtained.

These and other objects and advantages to be gained in the practice of this invention will be better understood and appreciated upon a reading of the following specification in regard to a preferred embodiment of the invention and having reference to the accompanying drawings wherein.

Figure 1:
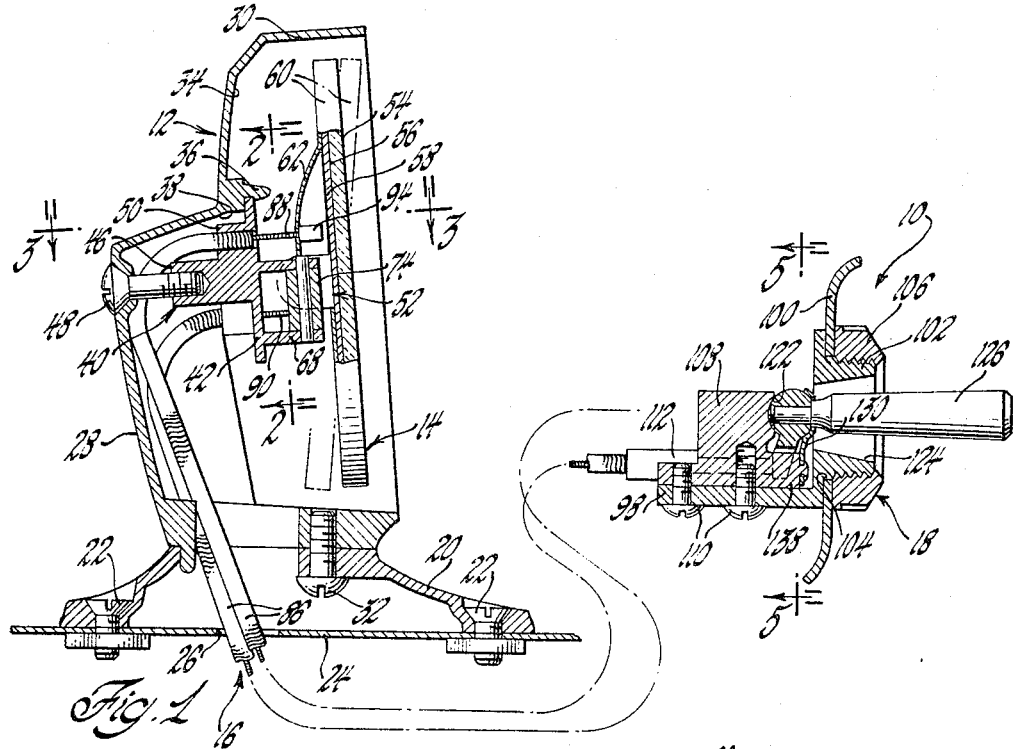
FIGURE 1 is a cross-sectional side view of the remote control mirror of this invention showing both the mirror mount and control therefor.
Figure 2:
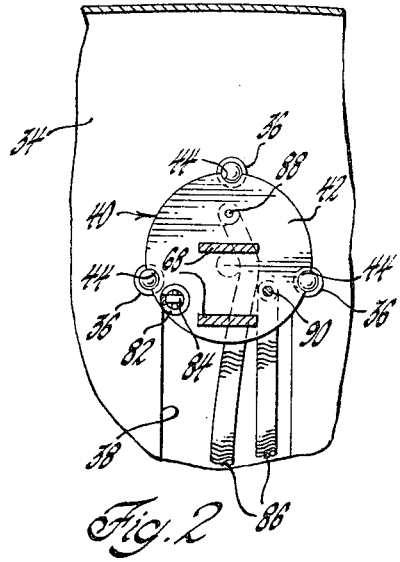
FIGURE 2 is a cross-sectional and enlarged view of a fragmentary part of the mirror mount shown by FIGURE 1 as seen in the plane of line 2—2 and looking in the direction of the arrows thereon.
Figure 3:
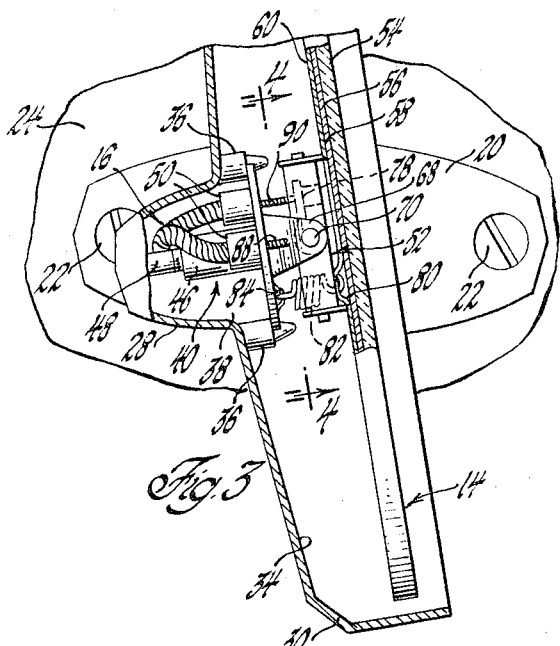
FIGURE 3 is a cross-sectional top plan view of the mirror mount shown by FIGURE 1 as seen in the plane of line 3—3 and looking in the direction of the arrows thereon.

The remote control mirror assembly 10 includes the mirror housing or mount 12 having a mirror member 14 provided therein. A pair of control cables 16 are operatively connected to the mirror 14 and are extended to a control mechanism 18 which is disposed apart and located remotely from the mirror head assembly.

In the subsequent discussion, reference made to forwardly or rearwardly disposed parts, outward or inward movements, etc., are to be accepted as with reference to the normal disposition, movement, etc., of a rear view mirror mounted for use on the side wall or fender panel of an automotive vehicle.

The mirror housing 12 includes a base 20 which is held by fastener means 22 to the vehicle body wall 24. A suitable access 26 is provided through the vehicle body wall 24 for the control cables 16.

On the base 20 is provided a combination pedestal and hood formed as an integral unit and with the pedestal part identified by the numeral 28 and the hood part identified by the numeral 30. Suitable fastener means 32 serve to secure such unit in a properly oriented disposition on the base 20.

The forwardly disposed pedestal part 28 is receptive of the control cable 16 therewithin. The rearwardly disposed and open hood part 30 includes an inner back wall 34 which is formed to provide support centering projection posts 36. An opening 38 is provided through the back wall 34 of the hood part for communication with the pedestal part and to receive the control cables 16 therethrough.

A mirror supporting member 40 is received within the mirror housing 12. It includes a central disc-like body part 42 having the peripheral edge formed to include notches 44 for locating the support on and relative to the projection posts 36 provided on the back walls 34 of the housing hood 30. A stud 46 projects from the back of the body part 42 into the pedestal part 28 and is receptive of a threaded fastener 48 provided on the pedestal part 28 to hold the support in its centered disposition on the back wall of the hood part 30.

The mirror support 40 is formed to include parts 50 receptive of a control cable 16 therethrough, in a manner later described, provided on the front face thereof and to which the mirror 14 is engaged.

The mirror member 14 is of the conventional type including a glass face 54 with a reflective back 56. It has a felt back 58 and is provided within a mirror casing or holder 60.

A part of the back wall of the mirror case 60 is formed outwardly as at 62 (best shown in FIGS. 1 and 4) and is adapted to have one of the control cables 16 secured thereto. It is also formed to include parallel spaced and rearwardly disposed tabs 64 receptive of pivot pin ends 66 on a member received therebetween and serving as part of the pivotal support as will later be described.

The part of the universal joint connection 52 which is on the support member 40 includes a pair of horizontally disposed arms 68 which are formed and extended in spaced relation from the face thereof. They receive a pivot pin 70 of a member which provides another pivotal axis for the mirror 14 as will subsequently be appreciated.

Figure 4:
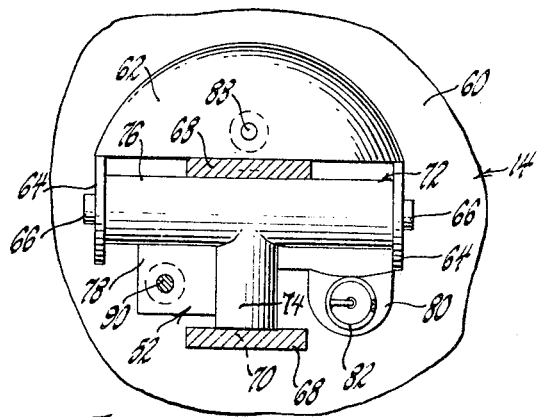
FIGURE 4 is an enlarged cross-sectional view of a fragmentary part of the mirror mount shown by FIGURE 3 as seen in the plane of line 4—4 and looking in the direction of the arrows thereon and rotated one-quarter turn.
Figure 5:
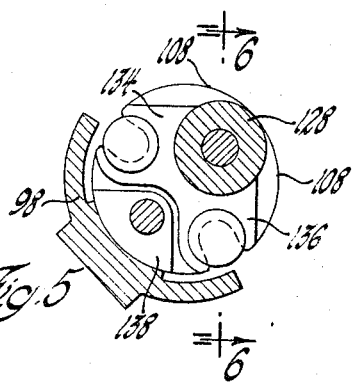
FIGURE 5 is an enlarged cross-sectional detail of the control member shown by FIGURE 1 as seen in the plane of line 5—5 and looking in the direction of the arrows thereon.

Referring to FIGURE 4, the universal joint connection 52 is of the conventional crossed axes type and includes a cross arm member 72 having a vertical arm part 74, through which the pivot pin 70 is extended, and a horizontal arm part 76 which includes the pivot pin ends 66. The cross arm parts 74 and 76 are received between the arms 68 on the support and the tabs 64 on the mirror casing 60, respectively. The pivotal axes which are thereby provided cross at a point spaced from the back of the mirror casing 60.

A web 78 is provided between the cross arm parts 74 and 76 of the universal joint connection 52, as best seen in FIGURE 4, and is adapted to have one of the control cables 16 engaged therewith.

Another part of the mirror casing 60 is formed outwardly, as at 80, to receive the end of a coiled tension spring 82 in engagement therewith. The other end of the spring 82 is engaged to retainer means 84 provided on the support member 40. The particular disposition of the spring 82 is of significance and will later be described in further detail.

The control cables 16 include Bowden wire type cables 88 and 90 having a cable sheath 86 through which flexible wires 88 and 90 are extended. These cables are received through the vehicle body wall 24, the mounting base 20, the pedestal part 28 and into engagement with the cable receptive part 50 on the support 40 where the sheaths 86 are retained and the wires 88 and 90 are extended on for operative engagement with the mirror 14. One of the cables 88 is connected to the back of the mirror, as at 94, and the other cable 90 is connected to the cross arm web 78 of universal joint connection. The other ends of the control cable extend to the control mechanism 18.

The control mechanism 18 includes a bracket part 98 which is received behind an inner body or dash panel 100 and includes threaded part 102 extending through an opening 104 in the panel and having a threaded nut 106 received in retaining engagement therewith. Another bracket part 108 is secured to the first mentioned part, behind the panel 100, as by fastener means 110.

The second bracket part 108 includes a pair of rearwardly disposed projections 112 receptive of the control cables 16 therein and for retaining engagement with the sheaths 86 thereof. Ferrules 114 are secured to the ends of the control cable wires 88 and 90 and are guided for longitudinal movement. A head 116 is provided on the ferrules and has the underside thereof cup shaped. A coiled compression spring 118 and a washer 120 are provided on the ferrules for purposes later described.

The bracket part 108 is formed to include a spherical recess or seat 122 and the bracket part 98 is formed to include an opening 124 therethrough providing direct communication with the face of the bracket part having the spherical seat.

An operating lever member 126 is extended through the bracket part opening 124 and has a ball head member 128 provided on the end thereof and received in the spherical seat 122. The ball head end of the operating lever 126 is held and retained in the spherical seat 122 by means of a spring clip 130 engaging the back side thereof and fastened to the bracket part 108.

The ball head member 128 is formed to include transversely disposed arms 134 and 136 which are bifurcated at the ends to receive the cable ferrules 114 therethrough. They are also formed to include the slight concavity receptive of the headed ends of the ferrules therein. The transverse arms 134 and 136 are received respectively between the washers 120 and the head ends of the ferrules and are accordingly biased outwardly by the compression springs 118.

It will be noted that the transverse arms 134 and 136 are disposed on opposite sides of a projection 138 provided on the bracket part 108. This has the spring clip 130 engaged therewith, serves to prevent rotation of the operating lever member 126, and also assists in coordinating the movement of the lever with the movement afforded the mirror 14, as will later be appreciated.

The remote control mirror 10 of this invention is pre-assembled and adjusted before installation.

The support 40 is connected to the mirror case 60 by the universal joint connection 52. The control cables 16 have their sheaths 86 received in the receptive projections 50 on the support and the control wires 88 and 90 extended through and engaged to the mirror case and support 78, respectively.

The tension spring 82 is engaged between the mirror case 60 and the support 40.

The support 40, with the mirror attached thereto, is positioned in the hood 30 and held by fastener 48 on the back wall projections 36.

The ends of the control cables 16 have their sheaths 86 received in the receptive projections 112 of the control bracket part 108 and their wires extended through and engaged to the ferrules 114 which have the springs 118 disposed thereon.

The ball head end 128 of the control lever 126 is received in the socket recess 122 of the bracket part 108 and held by the spring clip 130 with its arms 134 and 136 straddling the projection 138 and engaged with the cable pull ferrules 114.

The mounting part of the bracket, 98, is secured to the control part 108 and the assembly is ready for installation.

It will be appreciated that the ball head 128 of the operating lever 126 is frictionally held in the socket seat 122 by the spring clip 130 and thereby assures a positive setting of the control cable wires, when obtained, which avoids any fluttering of the mirror.

The control cable wire 88 is connected to the back of the mirror 14 at a position offset on the vertical axis of the universal joint connection 52 from the horizontal axis thereof. At the same time, the control wire cable 90 is connected to a part of the universal joint member offset from the vertical axis and also from the horizontal axis. Both control cable wires are thus offset from the respective axes about which they afford control; control wire 90 being used to obtain adjustment about the vertical axis and control wire 88 to obtain movement about the horizontal axis.

The spring 82 is itself connected between the mirror case 60 and the support at a position offset from both of the axes of pivotal movement afforded by the universal joint connection 52. It is further disposed on the opposite side of both pivotal axes from the different cable connections.

The tendency of the tension spring 82 to pull the cable wires out and bias the mirror 14 in a given direction is counterbalanced by the springs 118 acting on the other ends of the control wires 88 and 90. The two compression springs 118 balance the tension spring 82 and serve to hold the mirror 14 in an intermediate position in the absence of a control lever setting. Accordingly, any setting of the mirror by the control lever introduces a return bias; though insufficient to offset or effect the frictionally biased setting of the ball and socket mounted control lever.

The springs 82 and 118 serve to keep all slack out of the control wires 88 and 90 to assure positive response to control lever movement as will be appreciated.

The remote control mirror 10 is operated by finger control of the lever 126.

Figure 6:
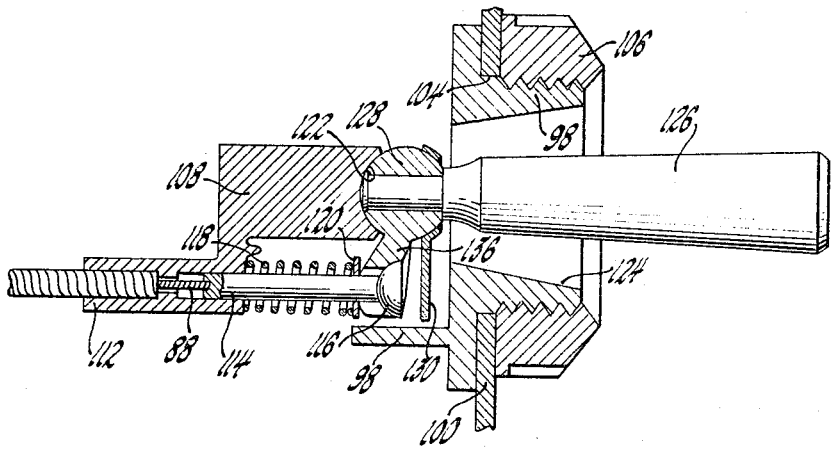
FIGURE 6 is a cross-sectional and side view of the control shown by FIGURE 5 as seen in the plane of line 6—6 and looking in the direction of the arrows thereon.

Referring to FIGURE 6, movement of the control lever 126 down compresses the spring 118 and relieves the counterbalancing spring force on the control cable wire 88. The spring 82, then unbalanced, pulls the mirror 14 down and the cable wire out with a consequent retraction of the ferrule 114 commensurate with the movement of the transverse arm part 136 effected by the control lever initially.

Movement of the control lever 126 to the left causes the same relative action with respect to the compression spring 118 acting on the other transverse arm 134 of the control lever, and the spring 82 acts to obtain movement of the mirror 14 to the left.

Movement of the control lever 126 upward or to the right will cause the control wire ferrule 114 to be pulled out, the biasing force of the spring 82 to be overcome, and mirror to be moved up or to the right as the case may be.

The bracket projection 138 between the control lever arms 134 and 136 serves, in part, to guide the upward or downward movement of the control lever 126 as required to adjust the mirror 14 by different persons using the mirror and having different levels of vision. Similarly, the projection serves to guide movement of the control lever to the left and right and corresponding movement of the mirror in and out for persons sitting in different viewing positions relative to the mirror.

The fixed axes of the universal joint 52, in the mirror head enables coordinated movement of the mirror, that is, either to the right or left, up or down, without disturbing the other setting unless and until desired. Thus adjustment is more natural and realistic and there is no hunting or feel required to reset the mirror from one setting to another. In most instances the control movement will be simply up or down for people of different heights. However, if other adjustment is desirable it is readily obtained before, after or during the primary control movement for those who wish.

The fixed axes of the universal joint 52 has another decided advantage in affording stability for the mirror 14 against lateral rotation. This is particularly advantageous as regards rectangular shaped mirrors in like shields or hoods where any lateral rotation may cause the mirror to rub on the side of the hood, be distrubingly cocked, or even hang up and be inoperable. The double axes of the universal joint affords the required universal joint movement for the mirror but precludes any lateral rotation.

The remote control rear view mirror which has been shown and described represents a preferred embodiment of this invention.

A simple universal joint connection is used which is inexpensive to manufacture, easy to assemble, and affords both the means of mirror support and fixed crossed axes for pivotal movement of the mirror.

Two control cable wires are all that are required to affect pivotal movement of the mirror in any direction. The control wires may be arranged to individually pull the mirror about its respective axes in one direction and counteracting spring means may be used to obtain pivotal movement in an opposite direction. The control wires accordingly need not be subjected to reversing compressive and tension stresses.

Of further note is the advantage of counterbalanced spring means in the mirror assembly whereby a neutral mirror setting is obtained and pivotal movement in any given direction may be obtained by relieving one of the counterbalancing means so that the other comes into play. As applied to the mirror through the control cables it is then practical to overcome one by pulling on the cable or to use the control, where the biasing means are conveniently located, to overcome the other and allow the means at the mirror to take over and affect the movement required. As the mirror is positioned the cable slack is taken up so that reverse movement is immediately responsive.

Although a preferred embodiment of this invention has been shown and described in detail, it will be appreciated that certain modifications and improvements are within the scope of the teachings set forth. Accordingly, such of these improvements and modifications as are within the spirit of the invention and are not specifically excluded by the language of the hereinafter appended claims, are to be considered as inclusive thereunder.

I claim:

1. A remote control rear view mirror, comprising; a support having a mirror member mounted thereon, a universal joint connection provided between said support and said mirror member and including transverse pivotal axes for oscillation of said mirror member on said support, and a pair of control cables operatively connected to said mirror member and respectively offset from different of said pivotal axes for individual control of movement of said mirror member about said respective axes, one of said control cables being directly connected to said mirror member and the other thereof to a part of said universal joint connection.

2. The remote control mirror of claim 1, including means engaged between said support and said mirror member and offset from both of said pivotal axes for biasing said mirror member in a given direction in the operative control of said mirror by said cable connections thereto.

3. The remote control rear view mirror of claim 1, said control cables having protective sheaths and said sheaths having the mirror member ends thereof received in relatively fixed engagement with said support.

4. The remote control rear view mirror of claim 1, including;
singular means for biasing said mirror member against control cable actuation about said axes in one direction and provided between said mirror member and said support at a position offset from both said pivotal axes,
and individual spring means provided concentrically of said control cables and being operatively engaged to said mirror member for counteracting said singular biasing means at least in part in the actuation of said mirror member on said support.

5. A remote control rear view mirror, comprising;
a mirror support including a hood,
a universal joint connection provided on said support and having a mirror member engaged thereto and disposed within said hood,
said universal joint connection including means providing first and second pivotal axes for oscillation of said mirror member relative to said support,
a pair of control cables received through said support and having one thereof connected to said mirror member at a position offset from said first pivotal axis and the other thereof operatively connected to said mirror member and offset from both said pivotal axes,
and means engaged between said support and said mirror member and offset from both of said axes for biasing said mirror member in a given direction in the operative control of said mirror member by said cable connections thereto,
said universal joint connection having the means providing said first pivotal axis connected to said mirror member and pivotal about said second pivotal axis, and said other control cable being connected to said first axis providing means and operatively connected to said mirror member thereby.

6. A remote control for a rear view mirror, comprising:
a mirror support
a universal joint connection provided on said support and having a mirror member engaged thereto,
said universal joint connection including means providing first and second pivotal axes for oscillation of said mirror member relative to said support,
the first and second pivotal axes being transversely disposed and in a common plane of reference,
a pair of control cables received through said support and having one thereof connected to said mirror member at a position offset from said first pivotal axis on said second pivotal axis and the other thereof operatively connected to said mirror member and offset from both said pivotal axes,
said universal joint connection having the means providing said first pivotal axis connected to said mirror member and pivotal about said second pivotal axis,
and said other control cable being connected to said first axis providing means and operatively connected to said mirror member thereby.

7. A remote control for a rear view mirrir, and comprising:
a support for a mirrir member mounted thereon,
a universal joint connection provided between said support and said mirror member and including means providing transverse pivotal axes for oscillation of said mirror member on said support,
a pair of control cables operatively connected to said mirror member at positions respectively offset from different of said pivotal axes for individual control of the movement of said mirror member about said axes,
said universal joint connection having one of the pivotal axes providing means thereof connected to said mirror member and the other thereof connected to said support,
and one of said control cables being directly connected to said mirror member and the other thereof being connected to said universal joint connection means for operating said mirror therethrough.

8. The remote control for a rear view mirror of claim 7, said control cables having protective sheaths and said sheaths having the mirror member ends thereof received in relatively fixed engagement with said support.

9. A remote control for a rear view mirror, comprising:
a support for a mirror member mounted thereon,
a universal joint connection provided between said support and said mirror member and including means providing transverse pivotal axes for oscillation of said mirror member on said support,
a pair of separate sheathed control cables operatively connected to said mirror member at positions respectively offset from different of said pivotal axes for individual control of the movement of said mirror member about said axes,
said universal joint connection having one of the pivotal axes providing means thereof connected to said mirror member and the other thereof connected to said support,
the sheaths of said control cables having the mirror member ends thereof received in relatively fixed engagement with said support,
singular means for biasing said mirror member against control cable actuation about said axes in one direction and provided between said mirror member and said support at a position offset from both said pivotal axes,
and individual spring means provided concentrically of said control cables and being operatively engaged to said mirror member for counteracting said singular biasing means at least in part in the actuation of said mirror member on said support.

(References on following page)

References Cited by the Examiner

UNITED STATES PATENTS

| | | | |
|---|---|---|---|
| 619,445 | 2/1899 | Smith. | |
| 1,345,157 | 6/1920 | Francisco | 248—288 X |
| 1,375,849 | 4/1921 | Latendorf | 248—288 |
| 1,618,773 | 2/1927 | Meyers | 248—183 |
| 1,626,938 | 5/1927 | Kelly | 88—98 |
| 1,630,217 | 5/1927 | Rasor. | |
| 2,545,649 | 3/1951 | Capellaro. | |
| 2,658,793 | 11/1953 | Sinclair | 248—288 X |
| 2,696,142 | 12/1954 | Langford | 88—93 |
| 2,903,944 | 9/1959 | Cooper | 88—93 |
| 2,906,292 | 9/1959 | Mayo | 88—93 X |
| 2,962,933 | 12/1960 | Hezler | 74—501 |
| 2,971,436 | 2/1961 | Smith | 88—98 |
| 3,046,840 | 7/1962 | Barcus | 88—93 |
| 3,046,841 | 7/1962 | Kawecki | 88—98 |
| 3,057,262 | 10/1962 | Jacobson | 88—93 |
| 3,077,142 | 2/1963 | Jacobson | 88—93 |

FRED C. MATTERN, Jr., *Primary Examiner.*

BROUGHTON G. DURHAM, MILTON KAUFMAN,
*Examiners.*

C. F. GREEN, *Assistant Examiner.*